Aug. 19, 1941.                H. ARMITAGE                2,253,316
                           RIVETLESS DRIVE PLATE
                          Filed July 21, 1939           2 Sheets-Sheet 1
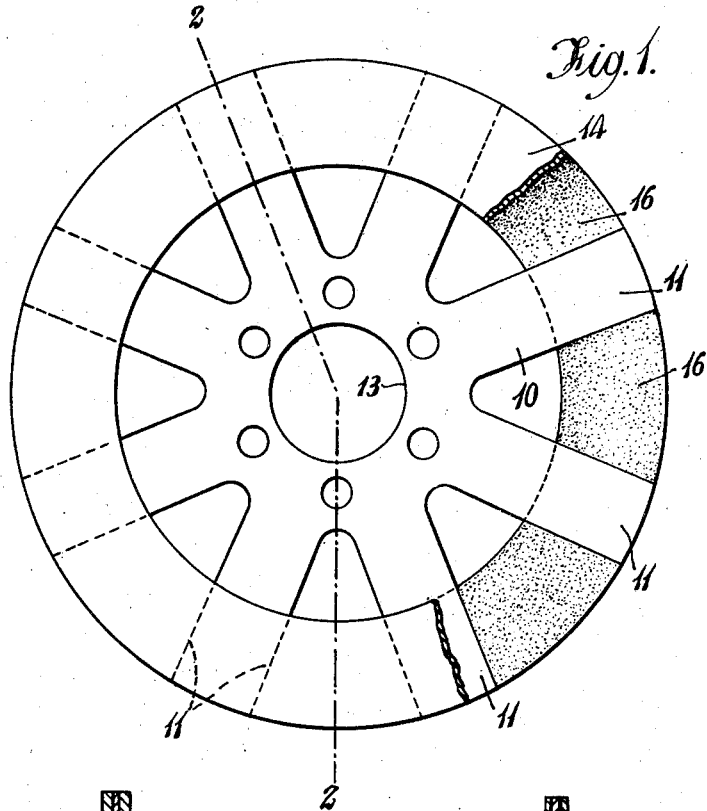
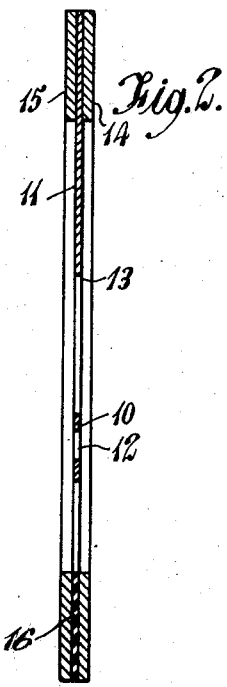
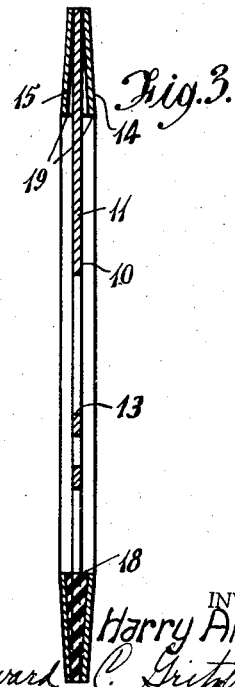
INVENTOR.
Harry Armitage
BY Edward C. Gritzbaugh
ATTORNEY.

Aug. 19, 1941.   H. ARMITAGE   2,253,316
RIVETLESS DRIVE PLATE
Filed July 21, 1939   2 Sheets-Sheet 2
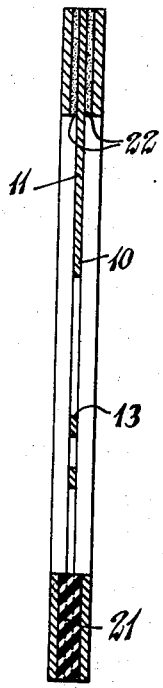
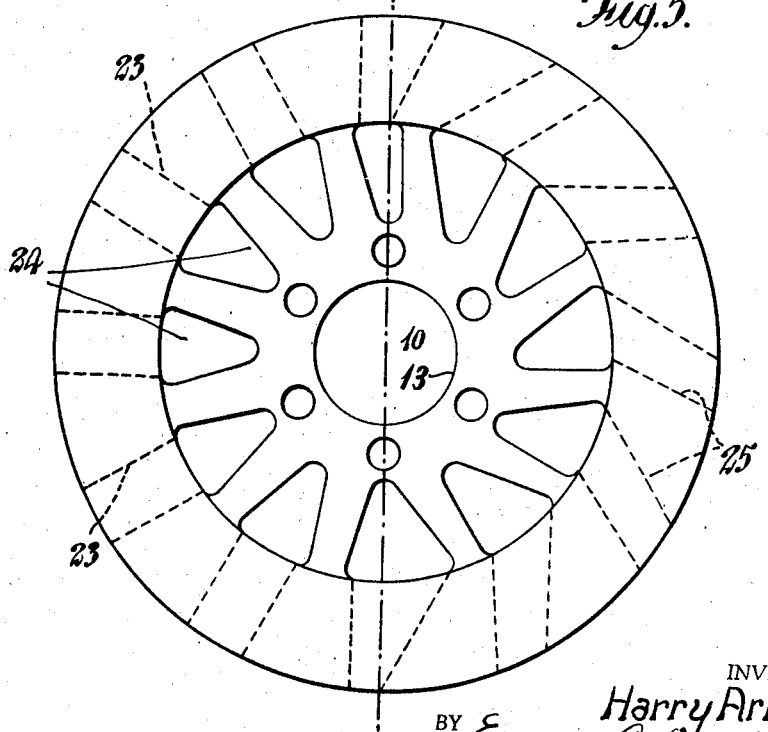
INVENTOR.
Harry Armitage
BY Edward C. Fritzbaugh
ATTORNEY Patented Aug. 19, 1941

2,253,316

UNITED STATES PATENT OFFICE 2,253,316

RIVETLESS DRIVE PLATE

Harry Armitage, London, England, assignor to Borg-Warner Corporation, Chicago, Ill., a corporation of Illinois Application July 21, 1939, Serial No. 285,699
In Great Britain July 26, 1938

10 Claims. (Cl. 192—107)

This invention relates to friction clutches of the kind in which a plate mounted on one shaft is engaged by axial pressure between members carried by a second shaft axially aligned with the first, to transmit torque from one to the other, the former shaft being commonly the driven shaft. The plate, particularly in clutches of the single plate type used in automobile vehicles, generally comprises a metal disc to the sides of which are secured facings of friction material which engage with the metal surfaces of the driving members, the facings being secured to the disc by rivets. With clutch plates of this kind, after the facing has become worn to a certain extent the rivet heads are level with or project from the facing surface, and tend to score the metal surfaces of the driving member.

The object of the present invention is to provide a clutch plate in which the facings are secured to the disc without the use of rivets.

According to the invention, a clutch plate comprises a metal disc, the peripheral portion of which is slotted or apertured, cushions of flexible and resilient material disposed in the slots or apertures in the disc, and an annular facing of friction material on each side of the disc, the facings being surface bonded to the flexible and resilient material. By "surface bonded" we mean secured by actual adhesion at the abutting surfaces, as by a vulcanizing process or by the use of an adhesive or bonding substance.

The cushions of flexible and resilient material may be formed of rubber or one of the known synthetic rubber-like materials, and the facings are preferably secured thereto by a vulcanising process.

The invention is hereinafter described with reference to the accompanying drawings, in which:

Figure 1 is an elevation of one form of clutch plate according to the invention;

Figure 2 is a section of the line 2—2 of Figure 1;

Figures 3 and 4 are sections corresponding to Figure 2 of clutch plates having modified forms of inserts; and Figure 5 is a composite elevation showing two further modifications of the form of the cushions, the left-hand half of the figure showing one form whilst the right-hand half shows another.

Figures 1 and 2 show a clutch plate comprising a steel disc 10 having a series of V-shaped portions cut out from its peripheral part, and so leaving a series of radial arms 11. The disc 10 is adapted to be secured to a hub by means of rivets passing through holes 12 surrounding a central aperture 13. Annular facings 14, 15 of friction material are mounted one on each side of the disc 10, and the spaces between the radial arms 11 are occupied by cushions 16 of rubber or rubber-like material of the same radial width as the facings, the facings 14, 15 being secured by vulcanising or other bonding process to the rubber or rubber-like material.

In the preferred form of the invention, the cushions 16 are formed of the material sold under the name of Neoprene or other material of the same class, and the friction material is bonded thereto by the use of a chlorinated natural rubber such as that sold under the registered trade-mark "Alloprene."

The clutch plate is prepared in the following manner. The friction material is slightly roughened on the side to be bonded to the cushions, and is coated with a solution of the chlorinated natural rubber in benzine. When the solvent has almost evaporated, the two rings of friction material 14, 15 and the metal disc 10 are assembled in a mould, the spaces defined by the arms 11 and the facings 14, 15 being filled with the Neoprene or equivalent material, and the plate is then vulcanised. The chlorinated natural rubber forms a bond between the Neoprene and the friction material, and the latter is thus held firmly in position on the steel disc. The mould employed for the vulcanising operation comprises two end plates, an external cylindrical wall, and an interrupted internal cylindrical wall to project between the radial arms 11 and close the inner sides of the spaces between the facings 14, 15. It will be understood that the particular substances referred to above are mentioned only by way of example, and that the cushions 16 may be formed of natural rubber, or any synthetic rubber-like substance or other flexible and resilient material, and the bonding agent may be any rubber-like substance with which the bond is achieved by vulcanisation, or any other suitable bonding agent or adhesive.

Figures 3 and 4 show alternative arrangements of the friction facings 14, 15 relatively to the steel disc 10. In Figure 3 the facings 14, 15 are slightly dished or coned, and the cushions 18 are tapered towards their radially outer ends, so that the inner edges of the facings are further apart than their outer edges, and engagement of the clutch first takes place at the inner edges of the facings, the cushions 18 being then compressed to bring the facings into parallelism, and to permit full engagement of the facings. The clutch disc according to Figure 3 is prepared in the same manner as that shown in Figures 1 and 2, the end plates of the mould being suitably dished to accommodate the modified friction facings, whilst movable wedge pieces are provided to occupy the spaces 19 between the arms 11 of the disc 10 and the friction facings. The wedge pieces are withdrawable towards the centre of the disc by suitable mechanism when the mould is opened, to permit removal of the finished plate.

The plate shown in Figure 4 has parallel-faced cushions 21 of greater thickness than the disc 10, so that the facings as a whole are capable of a certain degree of axial movement relative to each other against the resilient resistance set up by the compression of the cushions, thus assisting the gradual engagement of the clutch. Radial passages 22 are thus formed between the facings 14, 15 and the arms 10, and, during rotation of the clutch plate there is a tendency for air to be drawn through the passages by centrifugal force, thus assisting the cooling of the clutch. The cushions 21 are preferably bonded to the edges of the arms 11 of the steel disc, to prevent the facings from moving together relatively to the disc in such a way that the radial passages 22 on one side of the disc are reduced whilst the passages on the other side are widened.

The shape of the cut-away portions of the metal disc 10 may be different from that shown in Figure 1, and Figure 5 shows two alternative forms of disc. On the left-hand side of the figure the edge of the disc 10 is divided by a plurality of parallel-sided slots 23 each merging into a V-shaped space 24. On the right-hand side of the figure, the slots 25 are substantially parallel-sided but are non-radial. Cushion inserts of this latter form, and made according to the section in Figure 4 produce, when rotating, a fan action tending to increase the circulation of air through the clutch, thus providing increased cooling.

The surfaces of the friction material which are secured to the cushions of flexible and resilient material may be formed with ribs or grooves into or around which the unvulcanised material will flow when the plate is placed in the mould and the material filled into the spaces thus increasing the strength of the joint between the facings and the flexible and resilient material.

I claim:

1. A clutch plate comprising a mounting disc having circumferentially spaced peripheral portions, a pair of friction facings embracing said peripheral portions, and means joining said facings together and forming a torsionally yieldable torque transmitting connection between said facings and said discs, said means comprising a a cushion of resilient material disposed in the space defined between said facings and said spaced peripheral portions, extending from one to the other of said peripheral portions, and bonded to the opposed faces of said facings.

2. A clutch plate as defined in claim 1 wherein said cushions are formed of a material having the cushioning characteristics of rubber.

3. A clutch plate as defined in claim 1 wherein said cushions are formed of synthetic, rubber-like material and are bonded to said facings by chlorinated natural rubber.

4. A clutch plate as defined in claim 1 wherein said peripheral portions are in the form of spokes.

5. A clutch plate comprising a mounting disc having circumferentially spaced peripheral portions, a pair of friction facings embracing said peripheral portion and cushions of resilient material interposed between and bonded to the opposed faces of said facings in the space defined between said peripheral portion and said facings, said cushions constituting the sole means for joining said facings together and for joining said facings to said disc and transmitting torque therebetween.

6. A clutch plate as defined in claim 5 wherein said cushions are formed of a material having the cushioning characteristics of rubber.

7. A clutch plate comprising a mounting disc having circumferentially spaced peripheral portions, cushions bridging the spaces between adjacent peripheral portions, and a friction facing bonded to said cushions, said cushions forming the sole means for supporting said facing upon and connecting said facing to said disc for the yieldable transmission of torque therebetween.

8. A clutch plate as defined in claim 5 wherein said cushions present surfaces that are flared radially outwardly whereby to support said facings with their work engaging faces diverging with reference to the plane of the body of said disc.

9. A clutch plate as defined in claim 5, wherein said facings are spaced by said cushions out of contact with said mounting disc.

10. A clutch plate as defined in claim 5, wherein said peripheral portions are in the form of spokes.

HARRY ARMITAGE.